United States Patent
Sasaki et al.

[11] Patent Number: 6,130,736
[45] Date of Patent: Oct. 10, 2000

[54] LIQUID CRYSTAL DISPLAY WITH CORRUGATED REFLECTIVE SURFACE

[75] Inventors: Yorihiko Sasaki, Miyagi-ken; Mitsuru Kano, Fukushima-ken; Kenji Omote, Fukushima-ken; Yoshihiko Ishitaka, Fukushima-ken; Mitsuo Ohizumi; Tomomasa Takatsuka, both of Miyagi-ken, all of Japan

[73] Assignee: Alps Electric Co., Ltd., Tokyo, Japan

[21] Appl. No.: 09/094,064

[22] Filed: Jun. 9, 1998

[30] Foreign Application Priority Data

Jun. 13, 1997 [JP] Japan .................................. 9-157167
Jun. 20, 1997 [JP] Japan .................................. 9-164778

[51] Int. Cl.$^7$ ..................... G02F 1/1333; G02F 1/1335
[52] U.S. Cl. ..................... 349/122; 349/113; 349/106
[58] Field of Search ..................... 349/113, 106, 349/122

[56] References Cited

U.S. PATENT DOCUMENTS

| | | | |
|---|---|---|---|
| 5,220,444 | 6/1993 | Mitsui et al. | 349/113 |
| 5,296,965 | 3/1994 | Uetsuki et al. | 359/459 |
| 5,550,658 | 8/1996 | Yoshihiro | 349/113 |
| 5,576,860 | 11/1996 | Nakamura et al. | 349/113 |
| 5,614,594 | 3/1997 | Miyazaki et al. | 525/327.3 |
| 5,729,313 | 3/1998 | Mitsui | 349/106 |
| 5,734,457 | 3/1998 | Mitsui et al. | 349/106 |
| 5,796,455 | 8/1998 | Mizobata et al. | 349/113 |
| 5,818,554 | 10/1998 | Hiyama et al. | 349/106 |
| 5,847,791 | 12/1998 | Hao | 349/106 |
| 5,850,271 | 12/1998 | Kim et al. | 349/106 |

FOREIGN PATENT DOCUMENTS

| | | |
|---|---|---|
| 357011322 | 1/1982 | Japan . |
| 404212931 | 8/1992 | Japan . |

Primary Examiner—William L. Sikes
Assistant Examiner—Tarifur R. Chowdhury
Attorney, Agent, or Firm—Brinks Hofer Gilson & Lione

[57] ABSTRACT

A reflective type liquid crystal display of this invention comprises a reflector member having corrugated surface stored therein; an overcoat layer formed on the corrugated surface of the reflector member for making the corrugated surface flat; and a color filter layer formed on the overcoat layer, and wherein a thickness of the overcoat layer is more than twice of a depth of the concave part in the corrugated surface of the reflector member.

5 Claims, 7 Drawing Sheets

LIQUID CRYSTAL DISPLAY WITH CORRUGATED REFLECTIVE SURFACE

BACKGROUND OF THE INVENTION

1. Field of the Invention

This invention relates to a reflective type liquid crystal display in which merging of colors caused by a parallax is not present, a high contrast can be attained, a superior displaying quality is provided and its stable driving can be realized.

2. Description of the Prior Art

In general, as a displaying form of a liquid crystal display, there are provided an opaque type display having a back-light, a transparent type display and a reflective type display. The reflective type liquid crystal display is a liquid crystal display in which only external light such as a solar light and an illumination light or the like is utilized to perform a displaying operation without applying any back-light, and the display of this type is frequently used in a thin portable type information terminal equipment in which a light weight and a low consumption power are required, for example.

FIG. 10 is a sectional view for showing a schematic configuration of the general prior art reflective type liquid crystal display, wherein this display is an example of an STN reflective type liquid crystal display of a simple matrix system, in particular.

This reflective type liquid crystal display has a schematic configuration in which a liquid crystal cell 72 for a reflective mode STN (Super-Twisted Nematic) system and a phase difference plate 73 are laminated on a lower deflector plate 70 of a reflector plate 71 with a lower deflector plate 70, and a front deflector plate 74 is also laminated on this phase difference plate 73.

The aforesaid liquid crystal cell 72 has a schematic configuration in which a lower glass substrate 75, a color filter layer 76, a lower transparent electrode layer 78, a lower orientation film 79, an upper orientation film 80, an upper transparent electrode layer 81 and an upper glass substrate 82 spaced apart and oppositely arranged against the lower orientation film 79 are laminated in this order and an STN liquid crystal layer 83 is arranged between the aforesaid lower and upper orientation films 79, 80.

The aforesaid phase difference plate 73 is used for preventing a display from being colored in blue or yellow by accommodating a phase difference of light passing through the STN liquid crystal.

In the aforesaid prior art reflective type liquid crystal display, light incident to the front deflector plate 74 is linearly deflected by the deflector plate 74 and as the deflected light passes through the liquid crystal layer 83, it is changed into an ellipse deflected light, wherein the deflected light is approached to a linear deflected light under application of the phase difference plate 73 and further the light is linearly deflected through the lower deflector plate 70. The deflected light is reflected by the reflector plate 71, passes through the liquid crystal layer 83 and is outputted from the front deflector plate 74 in the same manner as that of the incident light. A white display and a black display are changed over under an application of voltage and in the case that the white display is carried out, a direction of deflection before incident to the lower deflector plate 70 is coincided with a direction of a deflection axis of the lower deflector plate 70, and in the case that the black display is carried out, they are crossed at a right angle.

However, in the prior art reflective type liquid crystal display shown in FIG. 10, although the display had some advantages that a consumption power can be reduced due to no requirement of a power supply for a back-light in addition to its thin-size and light weight features, it had a problem that its light display was slightly darkened as compared with that of the transparent type liquid crystal display having a back-light of high brightness.

In order to solve the aforesaid problems, there has been proposed that the lower deflector plate 70 arranged between the reflector plate 71 and the lower glass substrate 75 is removed and application of only one front deflector plate 74 arranged on the upper glass substrate 82 causes the light display to be bright at the time of selective application of voltage. However, in such a reflective type liquid crystal display as described above, since only one deflector plate is reduced, it may produce a problem that not only the light display is made bright, but also the dark display is made bright to cause their contrast to be decreased.

In view of the foregoing, the present applicant has shown, as a proposal in Japanese Patent Application No. Hei 9-36720, a reflective type liquid crystal display having a bright display in which a reflector, a color filter, a transparent electrode layer and an orientation film are arranged in sequence on the opposing surface of a lower glass substrate, a transparent electrode layer and an orientation film are arranged in sequence on the opposing surface of the aforesaid upper glass substrate, a first phase difference plate and a second phase difference plate are arranged in sequence on the outer surface of the upper glass substrate, a liquid crystal layer is arranged between the orientation films of the upper and lower glass substrates, and further a product $\Delta$nd of anisotropy of refractive index $\Delta$n of a liquid crystal and a layer thickness d of a liquid crystal, a relation between phase differences $R_1$, $R_2$ of each of the first and second phase difference plates or an angle of a deflecting axis of the deflector plate or an angle of a lagging axis of the first and second phase difference plates are limited to a specified range In addition, it is preferable to use a reflector member that, as the reflector member installed in such a reflection type liquid crystal display having the aforesaid configuration, some fine corrugated (concave or convex) portions are formed on the surface of the lower glass substrate in order to increase a visual angle, a metallic reflective film such as either an Al film or Ag film or the like is formed on the corrugated surface, thereby the surface of the metallic reflective film is provided with the corrugated surface acting as a reflective surface.

SUMMARY OF THE INVENTION

However, in the case of the liquid crystal display storing the reflector member having such corrugated surfaces, there occurred a problem that an irregular thickness is produced in a liquid crystal layer due to some corrugated states of the corrugated surface and a display quality is reduced. In addition, in the case of this liquid crystal display storing the reflector therein, an electrical insulating characteristic found between the reflector and the transparent electrode layer becomes a problem, an insufficient insulating characteristic does not enable a sufficient voltage to be applied to the liquid crystal layer when the liquid crystal display is driven, a certain influence appears in the display and a stable driving can not be attained.

The present invention has been invented in view of the aforesaid circumstances and it is an object of the present invention to provide a reflective type liquid crystal display in which an irregular thickness of the liquid crystal layer can be reduced and a sufficient insulating characteristic can be assured between the reflector and the transparent electrode layer (a display electrode).

In the present invention, the aforesaid problems are solved by applying a reflective type liquid crystal display comprised of a reflector member having corrugated surface stored therein, an overcoat layer formed on the aforesaid corrugated surface of the reflector member for making the aforesaid corrugated surface flat and a color filter layer formed on the overcoat layer characterized in that a thickness of the aforesaid overcoat layer is more than twice of a depth of the concave part in the corrugated surface of the aforesaid reflector member. In accordance with the reflective type liquid crystal display of the present invention, the overcoat layer is formed on the corrugated surface of the stored reflector member, a thickness of the overcoat layer is set to be more than twice of a depth of the concave part of the corrugated surface of the reflector member, thereby the corrugated portions in the corrugated surface of the reflector member are made flat by the overcoat layer, resulting in that it is possible to prevent irregular thickness from being generated due to the corrugated portions of the corrugated surface of the reflector member and to improve a display quality. In addition, the corrugated surface of the reflector member is covered by the overcoat layer having a thickness more than twice of a depth of the concave portions of the corrugated surface of the reflector member to enable an electrical insulating characteristic found between the reflector member and the transparent electrode layer (a display electrode) to be increased and also to apply a sufficient voltage to the liquid crystal layer when the display is driven, so that no adverse effect is applied in the display and a stable driving can be carried out.

In addition, the present invention provides means for solving the aforesaid problems by applying the reflective type liquid crystal display characterized in that a color filter layer comprised of colored patterns of red, green and blue is formed on the concave or convex surfaces of the stored reflector member.

In accordance with the reflective type liquid crystal display of the present invention, the color filter layer is directly formed on the corrugated surface of the stored reflector member, so that another layer is not present between the reflector member and the color filter layer, no merging of colors caused by anisotropy is present and a high contrast can be attained.

A colored pattern arrangement in the color filter layer on the corrugated surface of the reflector member is selected from any one of a stripe type in which each of pixels of three primary colors of red, green and blue is arranged alternatively or in vertical or lateral directions for every pixel in an order of red, green and blue, a delta type in which each of the pixels of the aforesaid three primary colors is alternatively arranged in a triangle shape for every pixels in an order of red, green and blue and a mosaic type in which each of the pixels of the aforesaid three primary colors is alternatively arranged in vertical and lateral directions for every pixels in an order of red, green and blue. Among these types, the stripe type is preferable.

It is preferable that no black matrix is formed around each of the pixels of the three primary colors of red, green and blue in such a color filter layer as above in view of improvement of brightness in display.

The aforesaid color filter layer can be formed by a pigment dispersion method in which a color filter layer forming resist having pigment dispersed therein is coated on the surface of the reflector member to form a pattern or a printing method in which a pattern formed on a printing plate is transferred to the surface of a reflector member through a blanket.

The aforesaid reflector member can be provided with the corrugated surface becoming reflective faces at its surface by a method wherein a metallic reflective film is formed on the fine corrugated surface of the substrate for the reflector member having fine corrugated surface at its front surface. As the substrate for the reflector member having the aforesaid fine corrugated surface, substrate formed by processing the surface of the glass substrate with hydrofluoric acid or substrate formed with some random corrugated surfaces at the surface of a photo-sensitive resin layer formed on the glass substrate through a transfer die may be applied.

In the aforesaid reflector member, too much large-sized corrugated portions of the corrugated surface cause a flattening of the corrugated surface of the reflector plate to be made difficult, the thickness of the liquid crystal layer to be irregularly formed or when the color filter layer is formed, the resist layer for forming the color filter layer shows an irregular pattern in a radial form from the center of the overcoat layer so as to prohibit a formation of the color filter layer and in turn too small-sized corrugated portions of the corrugated surface cause an attained regular reflection of the reflective type liquid crystal display to be increased and further cause a display having a narrow angle of sight to be attained, resulting in that it is preferable to have a depth of the concave portion ranging from 0.5 to 5 $\mu$m. The depth of the concave portion in the corrugated surface in the present invention is defined as a distance ranging from a top part of the convex portion to the bottom part of the concave portion.

In addition, it is more preferable that the corrugated surface of the aforesaid reflector member are set to have a surface roughness (Ra) of less than 1 $\mu$m and it is also more preferable that the width of the concave portion is less than 45 $\mu$m.

The aforesaid overcoat layer (a first overcoat layer) is made of acrylic material or the like. Such an overcoat layer can be formed by a method such as a spin coating method.

It is preferable that the thickness of the aforesaid color filter layer ranges from 0.15 $\mu$m to 1.2 $\mu$m due to the fact that as a base transmittance exceeds 50% (the thickness becomes too thin), a color regenerative characteristic in the liquid crystal display becomes inferior and in turn as a base transmittance is lower than 5% (the thickness becomes too thick), the transmittance of the color filter layer is decreased and a sufficient brightness may not be attained, so that it is preferable that its thickness ranges from 0.15 $\mu$m to 1.2 $\mu$m.

Further, in the reflective type liquid crystal display of the present invention, it is preferable that a second overcoat layer is formed on the aforesaid color filter layer in view of the fact that it is possible to improve an effect that the corrugated portions are made flat by the color filter layer and an irregular thickness of liquid crystal layer is prevented from being produced. The second overcoat layer is made of acrylic material or the like. In order to make corrugated portions flat under application of the color filter layer, it is preferable to keep the thickness of the second overcoat layer more than 0.5 $\mu$m.

It is preferable that the concave or convex surfaces of the aforesaid reflector member are made such that a plurality of long convex portions having apex parts continuously set at substantial same height along one direction of the glass substrate and the concave portions arranged between these long convex portions are installed side-by-side in a direction crossing at a right angle in respect to the aforesaid one direction, a height and a width of each of the long convex portions are formed in a random manner. In accordance with the reflector member having such concave or convex portions as above, it is possible to restrict a reflection of light from a non-required direction and perform an efficient reflection of light incident from a specified direction around a specified direction.

Thus, in accordance with the reflective type liquid crystal display in which there is provided in it a reflector member having concave or convex surfaces composed of a plurality of long convex portions having apex parts continuously set at substantial same height along one direction of the glass substrate and the concave portions arranged between these long convex portions installed side-by-side in a direction crossing at a right angle in respect to the aforesaid one direction, a height and a width of each of the long convex portions are formed in a random manner, the overcoat layer having a thickness of more than twice of a depth of the concave portions of the aforesaid corrugated surface is formed on the concave or convex surfaces of the reflector member and the color filter layer is formed on the overcoat layer, it is possible to reduce an irregular thickness of the liquid crystal layer, keep a sufficient electrical insulation between the reflector member and the transparent electrode layer (the display electrode), also restrict a reflection of non-required light from inner and outer sides and perform an efficient reflection of light in a requisite direction.

In addition, in accordance with the reflective type liquid crystal display in which there is provided in it a reflector member having corrugated surface composed of a plurality of long convex portions having apex parts continuously set at substantial same height along one direction of the glass substrate and the concave portions arranged between these long convex portions installed side-by-side in a direction crossing at a right angle in respect to the aforesaid one direction, a height and a width of each of the long convex portions are formed in a random manner, the color filter layer is formed on the corrugated surface of such a reflector member as above, another layer is not present between the reflector member and the color filter layer, so that no merging of colors caused by anisotropy is present, a reflection of non-requisite light from inner and outer sides is restricted and an efficient reflection of light in a required direction as well as a high contrast can be attained.

Further, it is preferable that the corrugated surface of the aforesaid reflector member are set such that many stripe grooves having curved sectional surface shapes of same R (a radius of curvature) and extending in the same direction are cooperatively arranged and widths of these grooves are changed in an irregular manner in such a way that interference stripes may be prevented from being generated. In accordance with the reflector member having such corrugated surface as above, a superior reflecting efficiency can be attained due to the fact that a reflecting direction of the light incident from a direction crossing at a right angle with a direction of each of the stripe grooves is extended in a wide range and thus a bright display surface can be provided. In addition, this reflector member enables a reflecting direction to be set in a wide range by an arrangement in which the widths of the adjoining grooves in particular are made different from each other. It is preferable that the aforesaid radius of curvature R is less than 100 µm due to the fact that if the value exceeds 100 µm, its stripe grooves are visually acknowledged to cause display quality of the liquid crystal display element to be decreased. In turn, in the case that the radius of curvature R is lower than a numerical value less than a visual light order, i.e. 0.4 µm, an effective reflecting characteristic may not be attained, so that it is preferable that the radius of curvature R is more than 0.4 µm.

Thus, in accordance with the reflective type liquid crystal display, a reflector member provided with a concave or convex portion in which many stripe grooves having curved sectional surface shapes of same R and extending in the same direction are cooperatively arranged and groove widths of these stripe grooves are irregularly changed to prevent any interference stripes from being produced by reflection light from these grooves are stored, an overcoat layer having a thickness more than twice of a depth of the concave portions of the aforesaid corrugated surface is formed on the corrugated surfaces of the aforesaid reflector member and a color filter layer is formed on the aforesaid overcoat layer. Accordingly, it is possible to reduce an irregular thickness of the liquid crystal layer, a sufficient insulating characteristic is kept between the reflector member and the transparent electrode layer (a display electrode), an angle of sight of the display surface as viewed from a direction crossing at a right angle with a direction of the stripe grooves can be made wide and the display surface can be entirely bright.

Thus, in accordance with the reflective type liquid crystal display, a reflector member provided with a concave or convex portion in which many stripe grooves having curved sectional surface shapes of same R and extending in the same direction are cooperatively arranged and groove widths of these stripe grooves are irregularly changed to prevent any interference stripes from being produced by reflection light from these grooves are stored, and a color filter layer is formed on the aforesaid concave or convex portion of the reflector member. In this liquid crystal display, another layer is not present between the reflector member and the color filter layer, so that no merging of colors due to anisotropy is present and further an angle of sight at the display surface as viewed from a direction crossing at a right angle with the directions of the stripe grooves can be made wide and the display surface can be entirely bright, so that a high contrast can be attained.

In addition, it is preferable that the corrugated surface of the aforesaid reflector member are made such that many stripe grooves having the curved sectional surface shapes of the same radius of curvature and extending in the same direction are cooperatively arranged, these stripe grooves are formed in a direction crossing at a right angle from each other, and a lateral width of each of the stripe grooves extending in the same direction of each of the aforesaid crossed stripe grooves is changed in an irregular manner in such a way that an interference stripes may not be produced with a reflection light attained from each of these grooves. In accordance with the reflector member having such corrugated surface as above, a reflecting range of light incident from a direction crossing at a right angle with a direction of each of the crossing stripe grooves is in a wide range, so that a reflecting efficiency is improved and a bright display screen can be attained. A crossing direction of the aforesaid crossed stripe grooves may be a right-angle crossing or crossed at a predetermined angle. Whatever angle may be applied, any crossing angle capable of providing the aforesaid action can be set. In addition, this reflector member enables its reflecting direction to be set to a wider range due to the fact that the adjoining groove widths of the stripe grooves extending in the same direction are made different from each other, in particular, thereby the reflecting directions can be set in a wider range.

Thus, in accordance with the reflective type liquid crystal display in which there is provided in it a reflector member having concave or convex surfaces where many stripe grooves having the curved sectional surface shapes of the same radius of curvature and extending in the same direction are cooperatively arranged, these stripe grooves are formed in a direction crossing at a right angle from each other, and a lateral width of each of the stripe grooves extending in the same direction of each of the aforesaid crossed stripe grooves is changed in an irregular manner in such a way that an interference stripes may not be produced with a reflection light attained from each of these grooves, an overcoat layer having a thickness more than twice of a depth of the concave portions in the aforesaid concave or convex surfaces is formed on the corrugated surface of the aforesaid reflector member and a color filter layer is formed on the aforesaid overcoat layer, it is possible to reduce an irregular thickness of the liquid crystal layer, a sufficient electrical insulating characteristic can be kept between the reflector member and the transparent electrode layer (a display electrode), an angle of sight at the display screen as viewed from a direction crossing at a right angle with each of the crossing stripe grooves can be made wide and an entire display surface can be made bright.

Additionally, in accordance with the reflective type liquid crystal display in which there is provided in it a reflector member having a corrugated surface where many stripe grooves having the curved sectional surface shapes of the same radius of curvature and extending in the same direction are cooperatively arranged, these stripe grooves are formed in a direction crossing at a right angle from each other, and a lateral width of each of the stripe grooves extending in the same direction of each of the aforesaid crossed stripe grooves is changed in an irregular manner, and a color filter layer is formed on the corrugated surface of the aforesaid reflector member, another layer is not present between the reflector member and the color filter layer, resulting in that no merging of colors caused by anisotropy occurs, an angle of sight of the display surface as viewed from a direction crossing at a right angle with a direction of each of the crossing stripe grooves is made wide and an entire display surface can be made bright, resulting in that a high contrast can be attained.

It is preferable that either the stripe grooves in the concave or convex surfaces or the crossing stripe grooves of the aforesaid reflector member are curved. The reflector member having such corrugated surface as above has a more improved reflecting efficiency due to the stripe grooves with a random pitch and a random depth and further enables a bright display surface having a wide angle of sight to be given due to a curved direction of the stripe grooves.

Thus, in accordance with the reflective type liquid crystal display in which there is provided in it a reflector member having a corrugated surface where either such curved stripe grooves or crossed stripe grooves are formed and a color filter layer is formed on the corrugated surface of the reflector member, another layer is not present between the reflector member and the color filter layer, so that no merging of colors caused by anisotropy occurs, an entire display surface can be made more bright and a high contrast can be attained.

DESCRIPTION OF THE PREFERRED EMBODIMENTS

Referring now to the accompanying drawings, some preferred embodiments of the present invention will be described in detail as follows.

Figure 1:
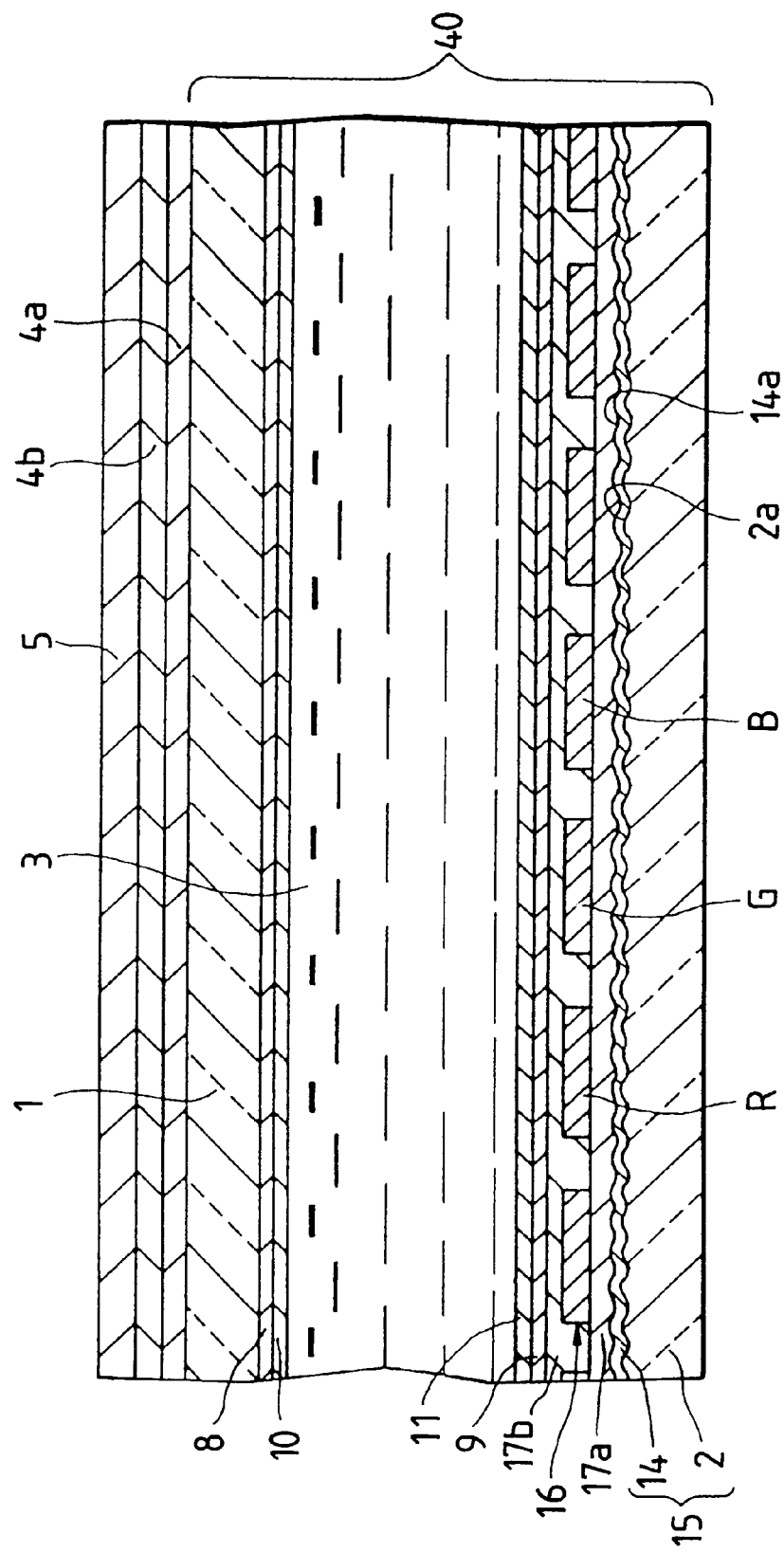
FIG. 1 is a sectional view for showing a first preferred embodiment of the reflective type liquid crystal display of the present invention.

FIG. 1 shows a first preferred embodiment of the reflective type liquid crystal display of an STN system of the present invention.

This reflective type liquid crystal display of this first preferred embodiment is made such that a liquid crystal layer 3 is arranged between a pair of displaying side glass substrate 1 and rear surface side glass substrate 2 having a thickness of 0.7 mm, for example, a first phase difference plate 4a and a second phase difference plate 4b made of polycarbonate resin or polyacrylate resin are arranged at the upper surface side of the displaying side glass substrate 1 in this order and further a deflector plate 5 is arranged at the upper surface side of the second phase difference plate 4b.

A transparent electrode layer (a segment electrode) 8 made of ITO (indium-tin-oxide) is formed at an opposing surface side of the displaying side glass substrate 1, and an orientation film 10 made of polyimide resin or the like is arranged on the transparent electrode layer 8.

A corrugated surface 2a having some fine corrugated portions processed by hydrofluoric acid is formed at the opposing surface side of the rear surface side glass substrate 2, and a metallic reflection film 14 is formed on the corrugated surface 2a. The metallic reflector film 14 formed in this way is provided with a corrugated surface 14a having a strict outer shape of the aforesaid corrugated surface 2a at its surface and then this corrugated surface 14a acts as a reflecting surface.

A member composed of a rear surface side glass substrate 2 (a reflector substrate having fine corrugated surface) formed with the fine corrugated surface 2a and the metallic reflector film 14 formed on the fine corrugated surface 2a and further provided with a corrugated surface 14a acting as a reflection surface at the surface of the metallic reflector film 14 is called as a reflector member 15.

On the corrugated surface 14a of such a reflector member 15 as above is formed a first overcoat layer 17a for use in making the corrugation of the corrugated surface 14a flat, and further on the first overcoat layer 17a are arranged a color filter layer 16, a second overcoat layer 17b, a transparent electrode layer (a common electrode) 9 made of ITO (indium-tin-oxide) or the like and an orientation film 11 made of polyimide resin or the like in this order.

Liquid crystal in the liquid crystal layer 3 is arranged to be twisted by 240° due to a relation with these orientation films 10, 11 or the like. The liquid crystal layer 3 is sealingly enclosed between the glass substrates 1 and 2 by a sealing member (not shown) The liquid crystal cell 40 in this preferred embodiment is comprised of the displaying side glass substrate 1, the rear surface side glass substrate 2 and a part held between these glass substrates 1 and 2.

Condition of processing with hydrofluoric acid applied when the fine corrugated surface 2a is formed on the rear surface side glass substrate 2 is set such that hydrofluoric acid solution of 5%, for example, is heated up to 50° C. and the glass substrate is immersed in water solution for 10 minutes.

As material forming the metallic reflector film 14, although material composed of Al or Al alloy, or Ag or Ag alloy can be applied, it is of course apparent that if other materials have a superior reflecting characteristic, they may be properly used.

Such a metallic reflector film 14 is formed to have a film thickness of about 1000 to 2000 Å by sputtering, vapor deposition, CVD (chemical vapor deposition), ion-plating and non-electrical field plating or the like.

It is preferable that a depth of the concave portion of the reflector member 15 is 0.5 to 5 μm and more preferably 0.7 to 3.0 μm due to the fact that too large corrugation of the corrugated surface 14a, it becomes difficult to make the corrugation of the corrugated surface 14a flat by the first overcoat layer 17a to be described later, an irregular thickness is produced in the liquid crystal layer, the resist film for forming the color filter layer is irregularly formed in a radial direction from the center of the first overcoat layer 17a and a trouble occurs in formation of the color filter layer and in turn too small corrugation of the corrugated surface 14a causes a regular reflection of the obtained reflective type liquid crystal display to be increased and further a display with a narrow angle sight to be attained. Further, it is more preferable that the corrugated surface 14a of the aforesaid reflector member 15 has a surface roughness of 1 μm or less and it is also more preferable that a width of the concave portion is 45 μm or less.

The aforesaid first overcoat layer 17a is made of acrylic material. Such a first overcoat layer 17a can be formed by a method such as a spin coating process.

A thickness of the first overcoat layer 17a is set to be more than twice of a depth of the concave portion of the corrugated surface 14a of the reflector member 14. For example, it is preferable that a thickness of the first overcoat layer 17a in the case that a depth of the concave portion of the corrugated surface 14a is in a range of 0.5 to 5 μm is set to be 1 to 10 μm. If the thickness of the first overcoat layer 17a is lower than twice of a depth of the concave portion of the corrugated surface 14a of the reflector member 14, the corrugation caused by the corrugated surface 14 can not be made flat, irregular thickness of the liquid crystal layer occurs, a displaying quality is decreased, and in addition, an electrical insulation between the reflector member 15 and the transparent electrode layer 9 is insufficient, a sufficient voltage can not be applied to the liquid crystal layer, a certain influence appears in display and then a stable driving of the device can not be performed. In addition, it becomes difficult to perform a uniform film formation if the thickness of the first overcoat layer 17a exceeds 10 μm.

The aforesaid color filter layer 16 is composed of coloring patterns of red (hereinafter abbreviated as R), green (hereinafter abbreviated as G) and blue (hereinafter abbreviated as B). As a method for forming the color filter layer 16, the color filter layer can be formed by a pigment dispersion method in which color filter layer forming resist having pigment dispersed therein is coated on the surface of the first overcoat layer 17a to form a pattern or by a printing method in which a pattern formed on a printing plate is transferred to the surface of the first overcoat layer 17a through a blanket.

Arrangement of the color filter layer 16 is selected from any one of a stripe type in which each of pixels of three primary colors, R, G, B is alternatively arranged in a vertical or lateral arrangement in an order of R, G, B, a delta type in which each of pixels of the aforesaid three primary colors is alternatively arranged in a triangle form in an order of R, G, B and a mosaic type in which each of pixels of the aforesaid primary colors is alternatively arranged in a vertical or lateral arrangement in an order of R, G, B and among these types, the stripe type is preferable.

It is preferable that a thickness of the color filter layer 16 is 0.15 μm to 1.2 μm. If a thickness of the color filter layer 16 is lower than 0.15 μm, a color re-producing characteristic of the liquid crystal display is deteriorated. In turn, the thickness exceeds 1.2 μm, a transmittance of the color filter layer is reduced and a sufficient brightness may not be attained.

A second overcoat layer 17b is arranged to improve some effects for making a corrugation of the color filter layer 16 flat and preventing the thickness of the liquid crystal layer from being irregularly formed. As material for producing the second overcoat layer 17b, acrylic material can be used. It is preferable that a thickness of the second overcoat layer is 0.5 μm or more in order to make corrugation of the color filter layer 16 flat.

In the reflective type liquid crystal display of this first preferred embodiment, the first overcoat layer 17a is formed on the corrugated surface 14a of the reflector member 15 stored therein, a thickness of the overcoat layer 17a is more than twice of a depth of the concave portion of the corrugated surface 14a of the reflector member 15, thereby corrugation caused by the corrugated surface 14a of the reflector member 15 is made flat, resulting in that it is possible to prevent irregular thickness of the liquid crystal layer caused by corrugation of the corrugated surface 14a from being produced and further to improve a displaying quality. In addition, the corrugated surface 14a of the reflector member 15 is covered by the first overcoat layer 17a having a thickness of more than twice of the depth of the concave portion of the corrugated surface 14a of the reflector member 15, resulting in that an electrical insulation between the reflector member 15 and the transparent electrode layer 9 can be increased and a sufficient voltage can be applied to the liquid crystal layer 3, so that no adverse effect appears in display and the device can be driven in a stable manner. Further, in the reflective type liquid crystal display of the first preferred embodiment, it is possible to improve some effects in which the second overcoat layer 17b is formed on the color filter layer 16, thereby corrugations caused by the color filter layer 16 are made flat and irregular thickness is prevented from being produced in the liquid crystal layer and a superior displaying quality can be attained.

Figure 2:
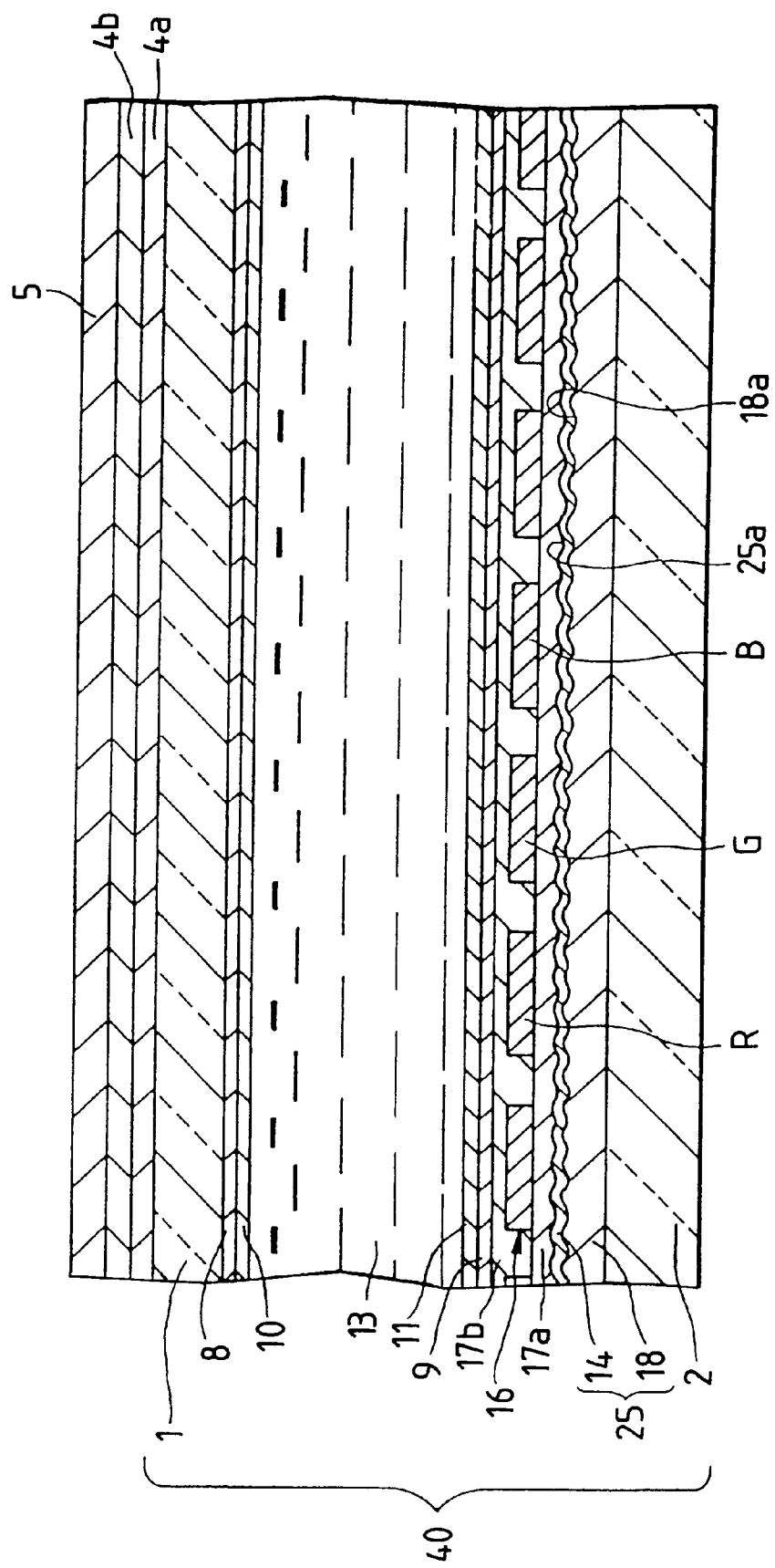
FIG. 2 is a sectional view for showing a second preferred embodiment of the reflective type liquid crystal display of the present invention.

FIG. 2 shows a second preferred embodiment of the reflective type liquid crystal display of a STN system of the present invention.

The reflective type liquid crystal display of the second preferred embodiment shown in FIG. 2 is different from that of the reflective type liquid crystal display of the first preferred embodiment shown in FIG. 1 in that a reflector member 25 having a corrugated surface 25a acting as a reflecting surface is arranged on the surface of the rear surface side glass substrate 2 not processed with hydrofluoric acid, and the color filter layer 16 is formed on the corrugated surface 25a of the reflector member 25 through the first overcoat layer 17a.

The aforesaid reflector member 25 is comprised of a photo-sensitive resin layer (a reflector substrate having fine corrugated surface) 18 formed with a corrugated surface 18a in a random manner on the surface by a transfer method and a metallic reflector film 14 arranged on the corrugated surface 18a, wherein the random corrugated surface 25a acting as a reflector surface is formed at the surface of the metallic reflector film 14.

Figure 3:
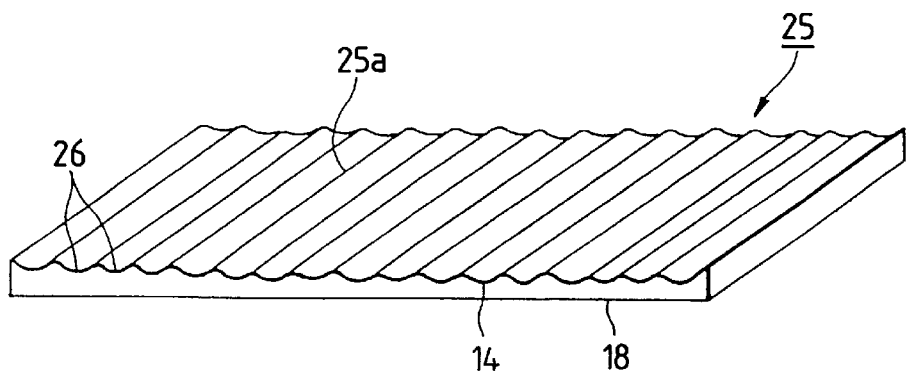
FIG. 3 is a perspective view for showing the reflector member installed in the reflective type liquid crystal display of the second preferred embodiment of the present invention.

The corrugated surface 25a of the aforesaid reflector member 25 is made such that, as shown in FIG. 3, many stripe grooves 26 having the same curved sectional surface (a radius of curvature) and extending in the same direction are cooperatively arranged, and these groove widths are changed in an irregular manner so as to prevent an interference stripe from being generated by reflection light obtained from these grooves 26.

It is preferable that the reflector member 25 has a depth of the corrugated part (a stripe groove) of the corrugated surface 25a ranging from 0.5 to 5 μm due to the same reason as that of the reflector member 15 installed in the reflective type liquid crystal display of the first preferred embodiment. In addition, it is more preferable that the corrugated surface 25a of the reflector member 25 has a surface roughness (Ra) of 1 μm or less and further it is more preferable that the width of the concave portion is 45 μm or less.

Additionally, it is preferable that a radius of curvature of the reflector member 25 is 100 μm or less. As the radius of curvature exceeds 100 μm, its stripe groove is visually acknowledged and a display quality of the liquid crystal display element is substantially decreased. In turn, in the case that the radius of curvature has a numerical value less than a visual light order, i.e. 0.4 μm or lower, an effective reflecting characteristic may not be attained, so that it is desirable that the radius of curvature is 0.4 μm or more.

The reflector member 25 installed in the reflective type liquid crystal display of the second preferred embodiment can be manufactured by a manufacturing method indicated as follows.

Figure 4A:
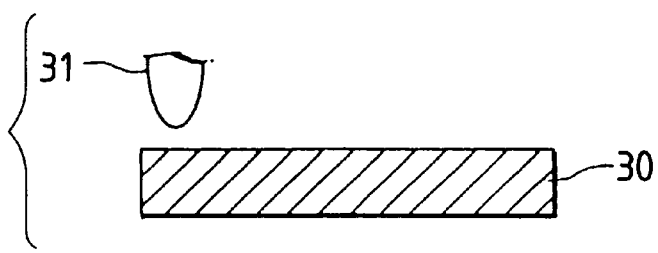
FIGS. 4a–4f are sectional views for showing a manufacturing method for the reflector member shown in FIG. 3 in an order of steps.

At first, as shown in FIG. 4A, the surface of a flat plate-type die 30 having a flat surface made of copper alloy or iron alloy, for example, is ground by a grinding jig 31 such as a cutting tool or the like having a cutting edge radius R of 30 to 100 μm while being cut in a straight line and further while its feeding pitch is being changed in a direction crossing at a right angle with the direction of groove so as to form a mother die 30 having a die surface with the groove widths of the adjoining stripe grooves 30a being made different from each other.

The feeding pitch P during grinding operation of the grinding jig 31 has four kinds of $P_1$ of 13 μm, $P_2$ of 16 μm, $P_3$ of 17 μm and $P_4$ of 18 μm, respectively, wherein the jig is fed while these four kinds of feeding pitches P are being changed in an irregular manner. For example, the grinding is carried out with a cutting tool having a cutting edge of R30 μm in the same depth for every units of feeding pitches of 18 μm, 13 μm, 13 μm, 16 μm, 17 μm, 13 μm, 13 μm, 17 μm and 13 μm in this order. In addition, the shape of the cutting edge of the grinding jig 31 is not an arcuate surface, and other various kinds of curved surface shapes maybe applied. However, the arcuate surface is desirable due to the fact that this surface may be most easily machined. A feeding pitch is not limited to the aforesaid four kinds of sizes, but several kinds of sizes may be combined in an irregular order.

Figure 4B:
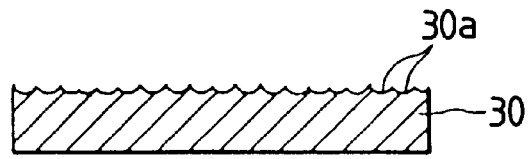

Additionally, it may also be applicable that a mother die 30 having a wall surface with the groove widths of the adjoining stripe grooves 30a shown in FIG. 4B being different from each other in which their feeding pitches are set to be the same from each other and the cutting depths are changed for every stripe grooves may be formed by performing a repetitive cutting of the unit composed of a certain number of stripe grooves.

In addition, the unit composed of a certain number of stripe grooves of which cutting depth is being changed for every stripe grooves while the feeding pitch is being changed is repeatedly cut and then the mother die 30 having a die surface with groove widths of the adjoining stripes 30a shown in FIG. 4B being different from each other may be formed.

Figure 4C:
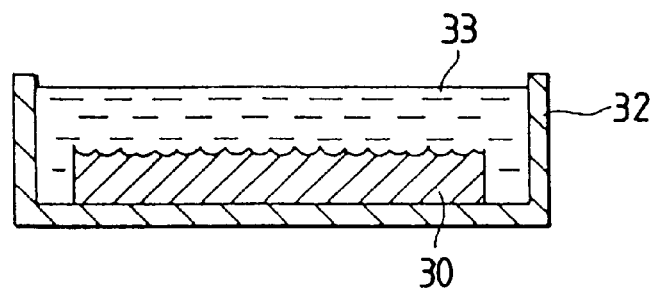
Figure 4D:
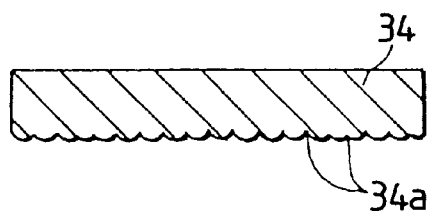

Then, as shown in FIG. 4C, the mother die 30 is stored in a box-like container 32, resin material 33 such as silicone, for example, is made to flow into the container 32, the material is left and hardened at a normal temperature, the hardened resin product is taken out of the container 32, non-required portions are removed from it so as to attain a transfer die 34 having a die surface with many inverse stripe grooves 34a of corrugated shape reverse to many stripe grooves 30a forming the die surface of the mother die 30 as shown in FIG. 4D.

Figure 4E:
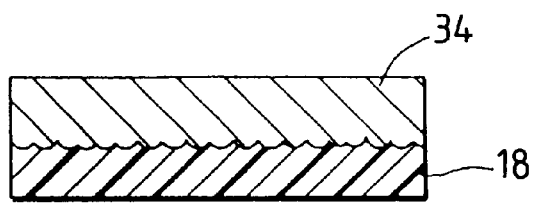
Figure 4F:
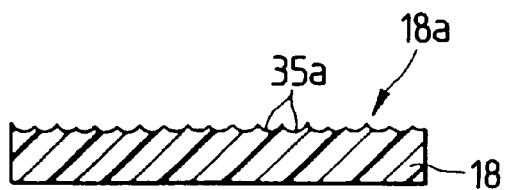

Additionally, as shown in FIG. 4E, the die surface of the transfer die 34 is pushed against the surface of the resin layer 18 made of resin material for reflector member so as to. harden the resin layer 18, thereby as shown in FIG. 4F, the stripe grooves 35a with the die surface of the transfer die 34 being transferred to their surfaces are formed, resulting in that the resin layer 18 having the corrugated surface 18a composed of stripe grooves 35a at its surface can be attained.

Lastly, as the metallic reflection film 14 is formed by making aluminum into a film through electron beam vapor deposition or the like, for example, on the corrugated surface 18a composed of stripe grooves 35a of the aforesaid resin layer 18, many stripe grooves 26 having the curved sectional surface with the same radius of curvature and extending in the same direction are cooperatively arranged and the reflector member 25 having the corrugated surface 25a with these groove widths being irregularly changed in such a way that no interference stripe is produced by the reflection light obtained from these grooves 26 can be attained.

In addition, the reflector member 25 can be manufactured by another method to be described as follows. At first, the transfer die 34 as shown in FIG. 4D is prepared as a mother die and the mother die 34 is arranged at a box-like container with its die surface being faced upward, epoxy resin is made to flow into it and hardened, the hardened resin product is taken out of the aforesaid box-like container, non-required portions are removed from the product so as to attain an intermediate die. Then, metal such as Ni or the like is electrically deposited to the surface of the intermediate die by an electrical casting method and the electrical deposited metal is peeled off from the intermediate die to attain a second transfer die. Proper reinforcing member is reinforced to the rear surface of the second transfer die, the die surface of the second transfer die is pushed against the surface of the resin base material to harden the resin base material, thereby there is provided the resin base material provided with many stripe grooves having the same shape in which the stripe groove 30a of the mother die 30 shown in FIG. 4B is transferred to the surface.

Then, the reflector member 25 can be attained by forming the metallic reflector film in the stripe groove installed in the resin base material in the same manner as that described above.

In accordance with the reflector member 25 having the corrugated surface 25a as described above, a reflecting efficiency is improved due to the fact that a reflecting direction of light incident from a direction crossing at a right angle with a direction of the stripe groove is in a wide range and then a bright display surface can be provided. In addition, it is possible that the reflector member 25 has a wide range of reflecting direction by making the groove widths of the adjoining grooves different from each other.

A thickness of the first overcoat layer 17a provided in the reflective type liquid crystal display of the second preferred embodiment is set to be more than twice of the depth of the concave portion of the corrugated surface 25a of the reflector member 25 due to the same reason as that for the layer of the reflective type liquid crystal display of the aforesaid first preferred embodiment.

In accordance with the reflective type liquid crystal display of the second preferred embodiment, many stripe grooves 26 having the curved sectional surface with the same radius of curvature and extending in the same direction are cooperatively arranged, and there is provided in it the reflector member 25 having the corrugated surface 25a in which the groove widths of these stripe grooves 26 are changed irregularly in such a way that no interference stripe is produced by the reflection light from these grooves, the color filter layer 16 is formed on the corrugated surface 25a of the reflector member 25 through the first overcoat layer 17a having a thickness of more than twice of a depth of the concave portion of the corrugated surface 25a of the reflector member 25, thereby an irregular thickness of the liquid crystal layer can be reduced, a sufficient electrical insulation is attained between the reflector member 25 and the transparent electrode layer 9, an angle of sight at the display surface as viewed from a direction crossing at a right angle with the direction of the stripe groove can be made wide and an entire display surface can be made bright.

In addition, in the aforesaid second preferred embodiment, the form in which each of the stripe grooves 26 of the corrugated surface 25a of the reflector member 25 is of a straight line has been described. However, another form may be applied in which each of the stripe grooves 26 of the corrugated surface 25a of the reflector member 25 is curved.

Then, a third preferred embodiment of the reflective type liquid crystal display of an STN system of the present invention will be described.

Figure 5:
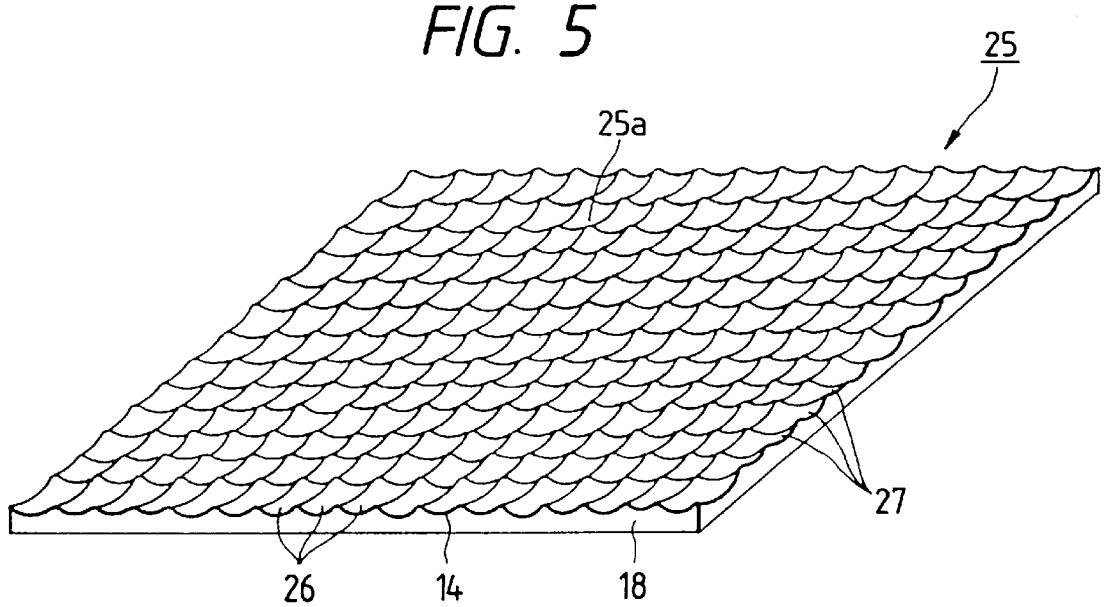
FIG. 5 is a perspective view for showing the reflector member installed in a third preferred embodiment of the reflective type liquid crystal display of the present invention.

The reflective type liquid crystal display of the third preferred embodiment is different from the reflective type liquid crystal display of the second preferred embodiment in that the corrugated surface 25a of the reflector member 25 is formed in such a way that many stripe grooves 26 (vertical grooves in FIG. 5), 27 (lateral grooves in FIG. 5) having the curved sectional surface with the same radius of curvature and extending in the same direction as shown in FIG. 5 are cooperatively arranged and these stripe grooves 26 and 27 are formed in such a direction as one in which they are crossed to each other and the groove widths of the adjoining stripe grooves extending in the same direction so as not to generate any interference stripe with the reflection light obtained from each of these crossing grooves and they are formed such that the heights of the adjoining convex portions of substantial pyramid shape are made different.

A method for manufacturing the reflector member 25 installed in the reflective type liquid crystal display of the third preferred embodiment can manufacture it in the substantial same manner as that for the reflector member 25 installed in the reflective type liquid crystal display of the aforesaid second preferred embodiment except the case in which the surface of the mother die is ground by a cutting jig such as a cutting tool or the like while being cut in a straight line form and also a feeding pitch being changed in a direction crossing at a right angle with the direction of groove and at the same time it is similarly cut in the direction crossing at a right angle with the cutting direction and the mother die is formed, the mother die having the die surface whose lateral widths of the adjoining stripe grooves extending in the same direction of each of the stripe grooves crossing at a right angle are different to each other.

In accordance with the reflector member 25 installed in the reflective type liquid crystal display of the third preferred embodiment, a reflecting direction of light incident from a direction crossing at a right angle with each of the directions of the crossing stripe grooves 26, 27 is set in a wide range, resulting in that a reflecting efficiency can be improved and a bright display surface can be attained. A crossing direction of each of the aforesaid crossing stripe grooves 26, 27 may be a right angle crossing or may be crossed at a predetermined angle. In any event, if they may provide the aforesaid action, it does not provide any problem for their crossing angles. In addition, this reflector member 25 can cause its reflecting direction to be more wide by making the groove widths of the adjoining grooves of the stripe groove 26 or stripe groove 27 extending in the same direction in particular different from each other.

In the reflective type liquid crystal display of the third preferred embodiment, there is provided in it the reflector member 25 having the corrugated surface 25a in which the stripe grooves 26, 27 having the curved sectional surface shape of the same radius of curvature crossed to each other are cooperatively arranged and the lateral width of the stripe grooves extending in the same direction of each of the aforesaid crossing stripe grooves 26, 27, may be changed in an irregular manner for preventing an interference stripe from being generated with the reflecting light obtained from these grooves, a color filter layer 16 is formed on the corrugated surface 25a of the reflector member 25 through the first overcoat layer 17a having a thickness of more than twice of the depth of the concave portion of the corrugated surface 25a, thereby an irregular thickness of the liquid crystal layer can be reduced and a sufficient electrical insulating characteristic is kept between the reflector member 25 and the transparent electrode layer 9, an angle of sight at the display surface as viewed from a direction crossing at a right angle with a direction of each of the stripe grooves 26, 27 crossed from each other can be made wide and an entire display surface can be made bright.

Although the reflective type liquid crystal display of the present invention in the aforesaid preferred embodiment has been described in reference to its STN system, it is of course apparent that the present invention can be applied to the reflective type liquid crystal display of a TN (Twisted Nematic) system in which a twisting angle of liquid crystal in a liquid crystal layer is set to 90°.

Additionally, in the aforesaid preferred embodiment, the system in which two phase difference plates 4a, 4b are formed at the upper surface side of the displaying side glass substrate has been described, although the type in which one phase difference plate is arranged may also be applicable. In addition, although the system in which the transparent electrode layer 8 is arranged on the orientation film 10 has been described, the reflective type liquid crystal display of the present invention may be formed of a type in which a top coat layer comprised of non-organic material such as silica or $ZnO_2$ or the like is placed between the orientation film 10 and the transparent electrode layer 8 in order to assure an electrical insulating characteristic.

Further, although the system in which the transparent electrode layer is formed on the color filter layer through the second overcoat layer-has been indicated, it is also applicable that the reflective type liquid crystal display of the present invention may of a type in which the transparent electrode layer is formed on the color filter layer without second overcoat layer. Further, although the system in which there is provided a color filter layer having no BM formed therein has been indicated, it is also applicable that the reflective type liquid crystal display of the present invention may be of a type in which a color filter layer formed with a linear BM around three primary colors of R, G, B is provided.

[EXAMPLES]

Referring now to the preferred embodiments and the examples of comparison, although the present invention will be described in more practical manner, the present invention is not limited only to these preferred embodiments.

[Example of Experiment]

An aluminum film with a thickness of 1200 Å was formed on the surface of the glass substrate processed with hydrofluoric acid at its one surface by an ion plating method, thereby various kinds of reflector members in which the maximum depth of the concave portion in the corrugated surface was changed in a range of 0.5 μm to 10.0 μm were made.

Then, each of the manufactured various kinds of reflector members was set to the spin coating machine and overcoat agent for forming the first overcoat (a product name: SS6699L, manufactured by Nihon Gohsei Rubber Co.,Ltd.) was coated on the corrugated surface under a condition of the number of rotation of 700 to 1000 rpm and for 20 seconds. After this operation, these reflector members were held by a hot plate at a temperature of 80 to 100° C. for 1 to 3 minutes and pre-baked, thereafter a post-baking operation was carried out by an oven under a condition of a temperature of 230 to 250° C. and for 30 to 60 minutes and the second overcoat layer having a different thickness was formed.

Then, each of the reflector members formed with the first overcoat layer was set at a spin coater and a red color resist (a product name: CFPR R-ST, photo-sensitive resin made by Tokyo Ohka Co. Ltd.) was coated on the first overcoat layer under a condition of the number of rotation of 1000 rpm and for 20 seconds. Next, it was held by a hot plate at 80° C. for 1 minute and pre-baked and a resist part (a photo-sensitive resin film) was formed, thereafter a photo-mask was arranged on the resist film and exposed under a condition of an exposing amount of 300 mJ/cm². After this operation, developing liquid (a product name: NA3K, made by Tokyo Ohka Co.,Ltd.) was applied to perform a usual developing operation for one minute, rinsing operation was performed with pure water for one minute, then an oven was applied to perform a post-baking operation under a condition of 200° C. for 30 minutes, thereby, a pattern of R was formed. Then, each of the pattern G and the pattern B was formed by the substantial same manner as the method for forming the aforesaid R pattern except using a green color resist and a blue color resist, thereby a color filter layer was formed.

Then, each of the reflector members formed with the color filter layer through the first overcoat layer was set on the spin coater and overcoat agent (a product name: SS6699L, manufactured by Nihon Gousei Rubber Co.,Ltd) for forming the second overcoat on the color filter layer under a condition of the number of rotation of 700 rpm for ten seconds. After this operation, they were held by the hot plate at a temperature of 80° C. for one minute and pre-baked, then, an oven was applied to perform a post-baking operation under a condition of 200° C. for 30 minutes and the second overcoat layer with a thickness of 5 μm was formed.

Then, they were applied to make various kinds of liquid crystal displays (sample Nos. 1 to 27) similar to that shown in FIG. 1. As the displaying side glass substrate constituting the liquid crystal display in this case, the substrate having a thickness of 7 mm was used. As the upper and lower orientation films, PSI-A-2501 (a product name: manufactured by Chisso Co.,Ltd.) was applied, an orientation processing direction (a rubbing direction) of the upper orientation film (a segment electrode side) was set to 30° and an orientation processing direction (a rubbing direction) of the lower orientation film (a common electrode side) was set to 30° in such a way that a twisting angle of a liquid crystal molecule might become 240°. As the STN liquid crystal, AP-4132LB (a product name: manufactured by Chisso Co., Ltd.) was used. As the first and the second phase difference plates, plates of polycarbonate were used, each of the phase differences was 450 nm and an optical axis of each of the plates was 20 to 30° and 90 to 100°, respectively. As the deflectorplate, NPF-EG1225DU (a product name: manufactured by Nittoh Denkoh Co.,Ltd.) was used and an absorbing axis was 85 to 90°. In addition, a thickness of the liquid crystal cell was 5.2 μm.

As to the various kinds of manufactured liquid crystal displays (sample Nos. 1 to 27), their displaying characteristics were checked. The displaying characteristics in this case were evaluated in reference to flatness, electrical conduction and displaying quality. The result of evaluation is indicated in the following Tables 1 and 2.

In Tables 1 and 2, ○ in the column of flatness indicates one in which a depth (a distance from the top end of the convex portion to the bottom end of the concave portion) of the concave portion left at the surface of the first overcoat layer is less than 0.05 μm, Δ indicates one in which a depth of the aforesaid concave portion is approximately 0.05 μm or so and × indicates one in which a depth of the aforesaid concave portion exceeds 0.05 μm. In addition, in the column of the electrical conduction, ○ indicates one in which a sufficient electrical insulation occurs between the reflector member and the transparent electrode layer and no electrical conduction occurs, and × indicates one in which an electrical insulation between the reflector member and the transparent electrode layer is insufficient and an electrical conduction occurs. In addition, in the column of displaying quality, ○ indicates one in which no irregular thickness of the liquid crystal layer (cell gap irregular thickness) is present and x indicates one in which irregular thickness of the liquid crystal layer (cell gap irregular thickness) is present.

TABLE 1

| Sample No. | Depth of concave portion of corrugated surface of reflector plate (μm) | Thickness of a first overcoat layer (μm) | Displaying characteristic | | |
|---|---|---|---|---|---|
| | | | Flatness | Electrical conduction | Displaying quality |
| 1 | 0.5 | 0.3 | x | x | x |
| 2 | | 0.5 | x | x | x |
| 3 | | 1.0 | ○ | ○ | ○ |
| 4 | | 2.0 | ○ | ○ | ○ |
| 5 | 1.0 | 0.5 | x | x | x |
| 6 | | 1.0 | x | x | x |
| 7 | | 2.0 | ○ | ○ | ○ |
| 8 | | 5.0 | ○ | ○ | ○ |
| 9 | 2.0 | 1.0 | x | x | x |
| 10 | | 2.0 | x | x | x |
| 11 | | 4.0 | ○ | ○ | ○ |
| 12 | | 10.0 | Δ | ○ | Δ |
| 13 | 4.0 | 2.0 | x | x | x |
| 14 | | 4.0 | x | x | x |
| 15 | | 8.0 | ○ | ○ | ○ |
| 16 | | 10.0 | Δ | ○ | Δ |
| 17 | 5.0 | 2.0 | x | x | x |
| 18 | | 5.0 | x | x | x |
| 19 | | 10.0 | Δ | ○ | Δ |
| 20 | | 20.0 | x | ○ | x |
| 21 | 6.0 | 3.0 | x | x | x |
| 22 | | 6.0 | x | x | x |
| 23 | | 10.0 | x | ○ | x |
| 24 | | 20.0 | x | ○ | x |
| 25 | 10.0 | 5.0 | x | x | x |
| 26 | | 10.0 | x | x | x |
| 27 | | 20.0 | x | ○ | x |

As apparent from the result indicated in the Table above, it is apparent that the liquid crystal displays of the comparison examples (Sample Nos.1, 2, 5, 6, 9, 10, 13, 14, 17, 18, 20, to 26) provided with the first overcoat layer having a thickness lower than twice of a depth of the concave portion of the corrugated surface of the reflector plate shows that at least one displaying characteristic of flatness, electrical conduction and displaying quality is inferior. On the contrary, it is apparent that liquid crystal displays of the preferred embodiments (Sample Nos. 3, 4, 7, 8, 11, 15 and 19) provided with the first overcoat layer having a thickness more than twice of a depth of the concave portion of the corrugated surface of the reflector plate have all superior flatness, electrical conduction and displaying quality. Additionally, as the thickness of the first overcoat layer in each of the liquid crystal displays of the preferred embodiments (Sample Nos. 12, 16 and 19) becomes 10 μm, a certain influence is started to be applied to the displaying quality or the like even though the electrical conduction is superior, so that it is acknowledged that it is preferable to set an upper limit of the thickness of the first overcoat layer to 10 μm.

Next, referring to the drawings, a fourth preferred embodiment of the reflective type liquid crystal display of the STN system in accordance with the present invention will be described in detail.

Figure 6:
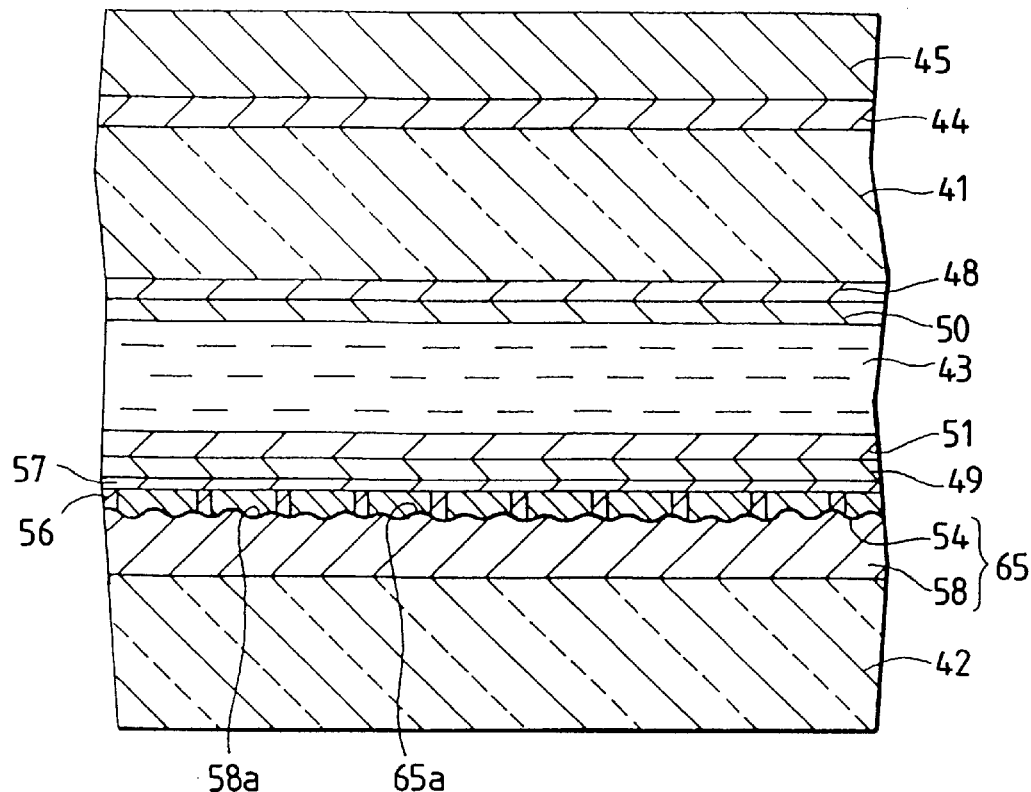
FIG. 6 is a sectional view for showing a fourth preferred embodiment of the reflective type liquid crystal display of the present invention.

FIG. 6 shows the fourth preferred embodiment of the reflective type liquid crystal display of the STN system of the present invention. The fourth preferred embodiment of the reflective type liquid crystal display is made such that a liquid crystal layer 43 is arranged between a pair of displaying side glass substrate 41 and rear surface side glass substrate 42 having a thickness of 0.7 mm, for example, one phase difference plate 44 made of polycarbonate resin or polyacrylate resin or the like is arranged on the upper surface side of the displaying glass substrate 41 and further a deflector plate 45 is arranged at the upper surface side of the phase difference plate 44.

At the opposing surface of the displaying glass substrate 41 is formed a transparent electrode layer 48 made of ITO (indium-tin-oxide) or the like and an orientation film 50 made of polyimide resin or the like is arranged on the transparent electrode layer 48.

At the opposing surface of the rear surface side glass substrate 42 is arranged a reflector member 65 provided with a corrugated surface 65a acting as a reflector surface at its surface, and a color filter layer 56 is directly formed on the corrugated surface 65a of the reflector member 65. On this color filter layer 56 is arranged a protection layer (an overcoat) 57 for use in protecting the color filter 56. Further, on this protective layer 57 is formed a transparent electrode layer 49 made of ITO (indium-tin-oxide) or the like and then an orientation film 51 made of polyimide resin or the like is arranged on the transparent electrode layer 49. Liquid crystal in the liquid crystal layer 43 is arranged to be twisted by 240° due to a relation between these orientation films 50 and 51 or the like. The liquid crystal layer 43 is sealingly enclosed between the glass substrates 41, 42 by a sealing member (not shown).

The reflector member 65 is composed of a photo-sensitive resin layer (a reflector substrate having a fine corrugated surface) formed with a random corrugated surface 58a at its surface by a transfer die and of a metallic reflector film 54 formed on the corrugated surface 58a, and a random corrugated surface 65a acting as a reflector surface is formed on the metallic reflector film 54.

Figure 7:
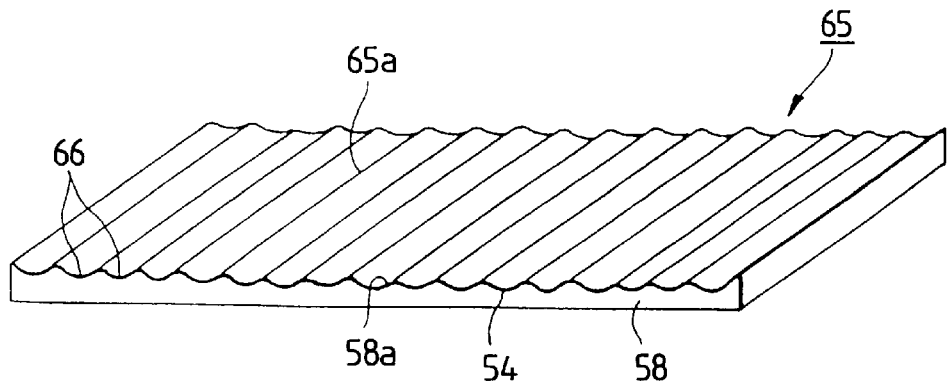
FIG. 7 is a perspective view for showing the reflector member installed in the reflective type liquid crystal display of a fourth preferred embodiment.

As shown in FIG. 7, many stripe grooves 66 having curved sectional surface shape of the same radius of curvature and extending in the same direction from each other are cooperatively arranged on the corrugated surface 65a of the reflector member 65 and widths of these grooves are irregularly changed in such a way that non interference stripe is produced by the reflection light projected from these grooves 66.

It is preferable that such a reflector member 65 as above fulfills at least one of the conditions that a surface roughness (Ra) of the corrugated surface 65a is 1 μm or less, a depth of the concave portion (a stripe groove) is 0.4 to 2 μm and a width of the concave portion is 45 μm or less due to the facts that too large-sized corrugation of the corrugated surface 65a causes a resist film for forming the color filter layer to show an irregular radial pattern from a center of the reflector member when the color filter layer 56 is formed and causes a certain trouble to occur while forming the color filter layer and in turn too small-sized corrugation of the corrugated surface 65a causes a regular reflection of the produced reflective type liquid crystal display to be increased and thus a display of narrow angle of view to be produced. A more preferable condition of this corrugated surface 65a fulfills at least one of the conditions that a surface roughness (Ra) is in a range of 0.2 to 0.8 μm, a depth of the concave portion is in a range of 0.5 to 1.5 μm, and a width of the concave portion is in a range of 5 to 30 μm or less.

In addition, it is preferable that a radius of curvature of the stripe groove 66 is 100 μm or less. As the radius of curvature exceeds 100 μm, its stripe groove is visually acknowledged, resulting in that a displaying quality of the liquid crystal display element is substantially reduced. In turn, in the case that the radius of curvature is lower than a numerical value of visual light order, i.e. 0.4 μm, an effective reflecting characteristic may not be attained, so that it is desirable that the radius of curvature is 0.4 μm or more.

The reflector member 65 provided in the reflective type liquid crystal display of the fourth preferred embodiment can be manufactured by a method for manufacturing the reflector member 25 shown in the reflective type liquid crystal device of the aforesaid second preferred embodiment, for example.

Figure 8:
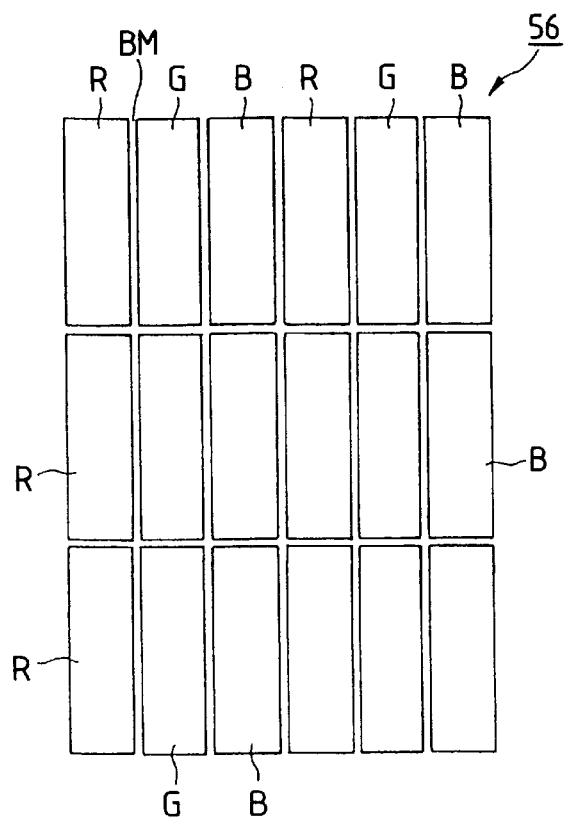
FIG. 8 is a front elevational view for showing an example of a stripe type coloring pattern arrangement of the color filter layer installed in the reflective type liquid crystal display of the present invention.
Figure 9:
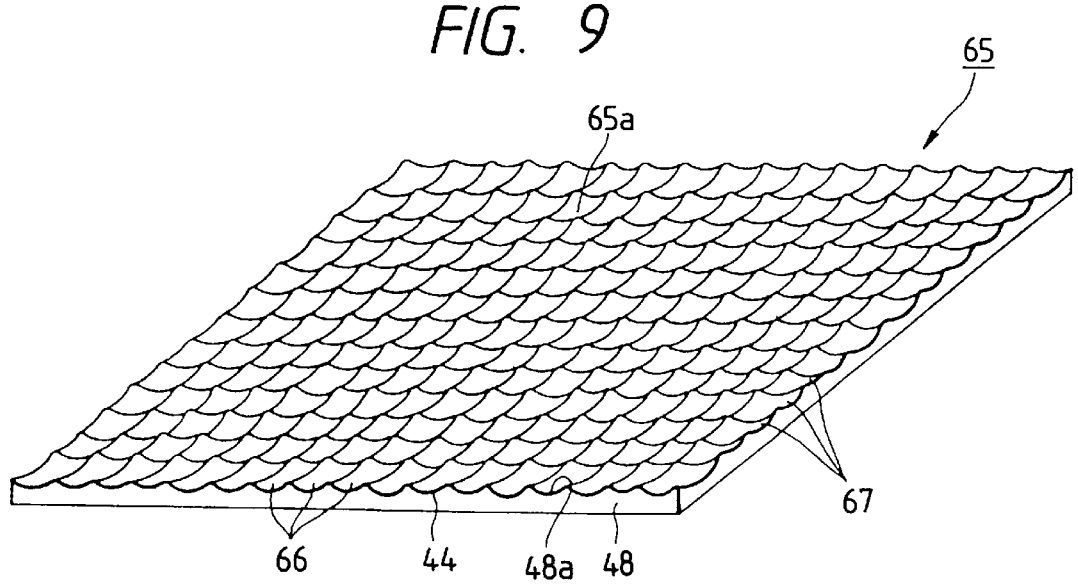
FIG. 9 is a perspective view for showing a reflector member installed in the reflective type liquid crystal display of a fifth preferred embodiment.
Figure 10:
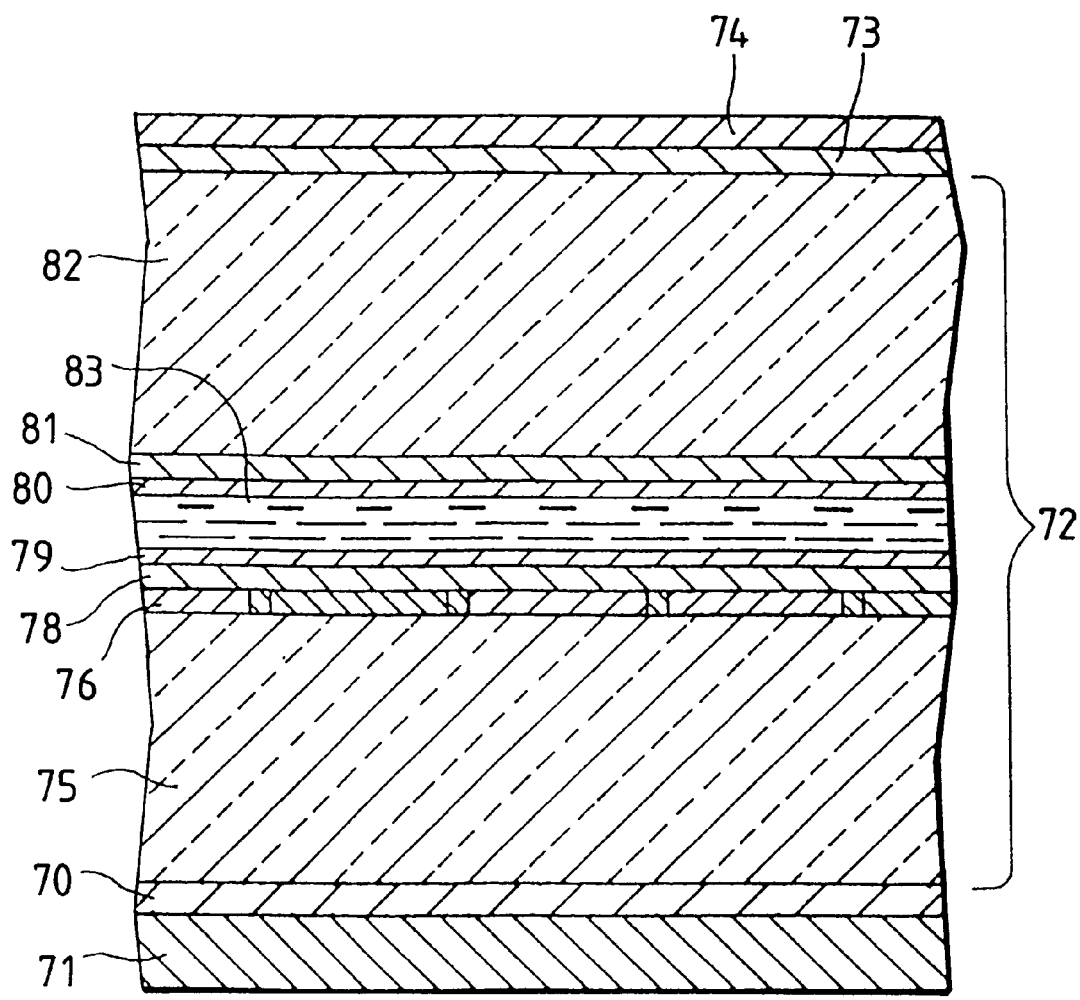
FIG. 10 is a sectional view for showing the prior art reflective type liquid crystal display.

The aforesaid color filter layer 56 is comprised of coloring patterns of red (hereinafter abbreviated by R), green (hereinafter abbreviated by G) and blue (hereinafter abbreviated by B). As a method for forming the color filter layer 56, the color filter layer can be formed by a pigment dispersion method in which color filter layer forming resist having pigment dispersed therein is coated on the corrugated surface 65a of the reflector member 65 to form a pattern or by a printing method in which a pattern formed on a printing plate is transferred to the corrugated surface 65a of the reflector member 65 through a blanket. A coloring pattern arrangement of the color filter layer 56 on the corrugated surface 65a of the aforesaid reflector member 65 is selected from any one of a stripe type in which each of pixels of three primary colors, R, G, B, as shown in FIG. 8, is alternatively arranged in a vertical or lateral arrangement in an order of R, G, B, a delta type in which each of pixels of the aforesaid three primary colors is alternatively arranged in a triangle form in an order of R, G, B and a mosaic type in which each of pixels of the aforesaid primary colors is alternatively arranged in a vertical or lateral arrangement in an order of R, G, B and among these types, the stripe type is preferable.

In addition, a linear black matrix (hereinafter abbreviated as BM) is set to have a patterning around each of the pixels of the aforesaid three primary colors in order to improve a contrast In the case that such a BM is formed, it is preferable that it is formed when the patterns of three primary colors of the aforesaid R, G, B are formed or before these patterns of three primary colors are formed. In order to improve a brightness of display, it is preferable that BM is not formed around each of the pixels in the aforesaid three primary colors.

It is preferable that a thickness of the color filter layer 56 is more than a depth of the concave portion of the corrugated surface 65a of the reflector member 65 and this is 0.4 to 2.5 μm, and more preferably 0.5 to 1.5 μm.

As material forming the aforesaid protective layer 57, PVA and acrylic resin or the like having a high close fitness to the color filter 56 are used.

In the reflective type liquid crystal display of this fourth preferred embodiment, many stripe grooves 66 with a curved sectional surface of the same radius of curvature and extending in the same direction are cooperatively arranged, and there is provided a reflector member 65 having a corrugated surface 65a in which the groove widths of the stripe grooves 66 are changed in such an irregular manner as to prevent an interference stripe from being generated by reflection light obtained from these grooves, a color filter layer 66 is formed on the corrugated surface 65a of the reflector member 65, thereby another layer is not present between the reflector member 65 and the color filter layer 66, resulting in that merging of colors caused by anisotropy is not produced, an angle of sight at the displaying surface as viewed from a direction crossing at a right angle with a direction of stripe grooves can be made wide and an entire display surface can be made bright, and a high contrast can be attained.

In addition, in the reflective type liquid crystal display of the aforesaid fourth preferred embodiment, although the form in which each of the stripe grooves 66 of the corrugated surface 65a of the reflector member 65 is in a linear form has been described, a type in which each of the stripe grooves 66 of the corrugated surface 65a of the reflector member 65 is curved may also be applicable. The reflector member 66 having the corrugated surface 65a with such curved stripe grooves 66 cooperatively arranged shows a more improved reflecting efficiency due to the fact that the stripe grooves have random pitch and depth, a curved groove direction of the strip enables a bright display surface having a wide angle of sight to be attained. Accordingly, in the reflective type liquid crystal display in which the reflector member 65 having the corrugated surface 65a cooperatively arranged with the curved stripe grooves 66 is stored and the color filter layer is formed on the corrugated surface 65a of the reflector member 65, since anther layer is not present between the reflector member 65 and the color filter layer 56, so that merging of colors caused by anisotropy is not present, a curved groove direction of the stripe causes an angle of sight to be wide and an entire display surface can be made bright, resulting in that a high contrast can be attained.

Next, a fifth preferred embodiment of the reflective type liquid crystal display of STN system will be described as follows.

The reflective type liquid crystal display of the fifth preferred embodiment is different from the reflective type liquid crystal display of the fourth preferred embodiment in that the corrugated surface 65a of the reflector plate 65 has many stripe grooves 56 (a vertical groove in FIG. 8) with a curved sectional surface having the same radius of curvature and extending in the same direction and 67 (a lateral groove in FIG. 8 cooperatively arranged, these stripe grooves 66 and 67 are formed in such directions as one crossing at a right angle with each other, they are formed in such a way that the groove widths of the adjoining stripe grooves extending in the same direction to prevent an interference stripe from being generated by a reflection light obtained from each of these crossing grooves are made different from each other, and they are made to have such a shape as one in which the heights of the adjoining convex portions of substantial pyramid shape are made different.

A method for manufacturing the reflector member 65 installed in the reflective type liquid crystal display of the fifth preferred embodiment can be carried out in a substantial same manner as that for the reflector member 25 installed in the reflective type liquid crystal display of the aforesaid third preferred embodiment.

In accordance with the reflector member 65 installed in the reflective type liquid crystal display of the fifth preferred embodiment, since the reflecting direction of light incident to a direction crossing at a right angle with each of the directions of the crossing stripe grooves 66, 67 is in a wide ranged, its reflecting efficiency can be improved and a bright display surface can be attained. A crossing direction of the aforesaid crossing stripe grooves 66, 67 may be a right angle crossing or a crossing at a predetermined angle. In any case, if they have the aforesaid action, their crossing angle is not a problem at all. In addition, the reflector member 65 can set the reflecting direction to be more wide range by making the widths of the adjoining stripe grooves 66 or stripe grooves 67 extending in the same direction, in particular, different from each other.

In the reflective type liquid crystal display of the fifth preferred embodiment, the stripe grooves 66, 67 having the curved sectional surface with the same radius of curvature and crossing at a right angle from each other are cooperatively arranged, there is provided in it the ref lector member 65 having the corrugated surface 65a with the lateral widths of the aforesaid crossing stripe grooves 66, 67 extending in the same direction not to generate any interference stripe by the reflecting light from these grooves being irregularly changed, the color filter layer 56 is formed on the corrugated surface 65a of the ref lector member 65, resulting in that another layer is not present between the ref lector member 65 and the color filter layer 56, and so merging of colors caused by anisotropy is not produced and in addition, an angle of sight at the display surface as viewed from a direction crossing at a right angle with each of the directions of the crossing stripe grooves 66, 67 can be made wide, an entire display surf ace can be made bright, so that a high contrast can be realized.

Although the reflective type liquid crystal display of the present invention in the aforesaid preferred embodiment has been described in reference to its STN system, it is of course apparent that the present invention can be applied to the reflective type liquid crystal display of a TN (Twisted Nematic) system in which a twisting angle of liquid crystal in a liquid crystal layer is set to 90°.

Additionally, in the aforesaid preferred embodiment, the system in which one phase difference plate 44 is formed at the upper surface side of the displaying side glass substrate has been described, although the type in which two phase difference plates are arranged may also be applicable. In addition, although the system in which the protective layer 57 is arranged between the color filter layer 56 and the transparent electrode layer 49 has been described, the reflective type liquid crystal display of the present invention may be formed of a type in which the transparent electrode layer is directly arranged on the color filter layer. Further, although the system in which there is provided a color filter layer formed with a linear BM around three primary colors of R, G, B has been indicated, it is also applicable in the reflective type liquid crystal display of the present invention to employ a type in which there is provided a color filter layer having no BM formed therein.

Referring now to the examples and the comparison examples, the present invention will be described in more practical manner. However, the present invention is not limited only to these examples.

[Example 1]

Acrylic photo-sensitive resin (a product name: CFPRCL-017S made by Tokyo Ohka Co. Ltd.) was coated on a glass substrate by a spin coater to have a thickness of 5 µm, pre-baked at 80° C. to attain a photo-sensitive resin layer.

Then, a silicon die made in the same manner as that for the transfer die 34 shown in FIG. 3 was prepared, the die was pressed against the aforesaid photo-sensitive resin layer with a pressure of 50 kg/cm$^2$ and a corrugated portion of the silicon die was transferred to the upper part of it. Then, ultra-violet ray was radiated from the rear surface side of the substrate while the silicon die was being pressed against the photo-sensitive resin layer.

Upon radiation of ultra-violet ray, an aluminum film with a thickness of 1500 Å was vapor deposited on the corrugated surface of upper face of the photo-sensitive resin layer so as to attain a reflector member having a depth of the concave portion at the corrugated surface of 0.9 µm.

Then, a photo-sensitive resin for red color (a product name: CFPR R-ST made by Tokyo Ohka Co.,Ltd.) was coated on the corrugated surface of the reflector member by a spin coater. Thus, after it was pre-baked at 80° C. to form the photo-sensitive resin layer, a photo-mask was arranged on the layer to expose it, then developed, post-baked at 200° C. and a R (red) pattern was formed. Then, as to a G (green) pattern and a B (blue) pattern, except photo-sensitive resin for green color (a product name: CFPR G-ST, made by Tokyo Ohaka Co.,Ltd.) and a photo-sensitive resin for blue color (a product name: CFPR B-ST, made by Tokyo Ohka Co.,Ltd.), the G pattern and the B pattern were made by the same forming method as one for forming the aforesaid R pattern and the color filter layer was directly formed on the corrugated surface of the reflector member.

Thus, overcoat acrylic agent for forming a protective film (a product name: SS6699 L, made by Nihon Gohsei Rubber Co.,Ltd.) was coated on the color filter layer by a spin coater. After this operation, the deflector member was pre-baked at 80° C. and then it was post-baked at 200° C. to form the protective film.

[Example 2]

A reflector member made by the same manner as that of the aforesaid example 1 was set and photo-sensitive resin (a product name: CFPR BK708S, made by Tokyo Ohka Co., Ltd.) for black color was coated on the corrugated surface of the reflector member by a spin coater. Then, it was pre-baked at 80° C. to form a photo-sensitive resin layer, a photo-mask was arranged on the layer, exposed and then it was developed, it was post-baked at 200° C. to form a BM (black matrix).

Next, photo-sensitive resin for red color was coated on the corrugated surface of the reflector member formed with BM which was similar to that applied in the aforesaid example 1. Then, it was pre-baked at 80° C. to form a photo-sensitive resin layer, thereafter a photo-mask was arranged on the layer, exposed, then developed, it was post-baked at 200° C. to form a R pattern. Next, as to each of G pattern and B pattern, G pattern and B pattern were formed by a method which was substantially similar to that applied in the aforesaid example 1 except using photo-sensitive resin for green color and photo-sensitive resin for blue color, thereby the color filter layer was directly formed on the corrugated surface of the reflector member.

Then, overcoat acrylic agent for forming a protective film which is similar to that applied in the aforesaid example 1 was coated on the color filter layer by a spin-coater. After this operation, this reflector member was pre-baked at 80° C. and post-baked at 200° C. to form a protective film.

[Comparison Example 1]

A color filter layer was formed on the corrugated surface of the reflector member under a condition which is the same as that of the example 1 except a condition in which a reflector having a depth of the concave portion of the corrugated surface of 3.5 µm is used. Further, a protective film is formed on the color filter layer.

As a result, when a photo-sensitive resin forming a color filter was coated on the corrugated surface of the reflector, the photo-sensitive resin was irregularly dispersed in a radial direction from the center of the reflector and a certain trouble was produced when a superior color filter layer was made.

[Comparison Example 2]

A color filter layer was formed on the corrugated surface of the reflector member under the same condition as that of the example 1 except the fact that the reflector having a depth of the concave portion of the corrugated surface of 0.2 μm was used and then a protective film was formed on the color filter layer.

[Comparison Example 3]

A color filter layer was formed on the upper surface of the glass substrate in the same manner as that of the aforesaid example 1 and a reflector member made in the same manner as that of the aforesaid example 1 was arranged at the lower surface of the aforesaid glass substrate through an adhesive member made of glycerin not applying adverse effect on a refractive index of light.

[Comparison Example 4]

A color filter layer was formed on the upper surface of the glass substrate in the same manner as that of the aforesaid example 2 and a reflector member made in the same manner as that of the aforesaid example 1 was arranged at the lower surface of the aforesaid glass substrate through an adhesive member made of glycerin not applying adverse effect on a refractive index of light.

Then, various kinds of liquid crystal display panels (Sample Nos. 1 to 5) were made by the reflector and the color filter layer (CF) attained by the examples 1 to 2 and comparison examples 2 to 4. As an upper orientation film and a lower orientation film constituting a liquid crystal display panel, PSI-2501 (a product name: made by Chisso Co.,Ltd.) was applied and an orientation processing was carried out in such a way that a twisting angle may become 240°. As an STN liquid crystal, AP-4132LA (a product name: made by Chisso Co.,Ltd.) was used. As a phase difference plate, a plate made of polycarbonate was used. As a deflector plate, NPF-EG1225DU (a product name: made by Nittoh Denkoh Co.,Ltd.). A reflecting characteristic against an incident light, a color merging state and a contrast were checked for various kinds of manufactured liquid crystal display panels. The result of check is indicated in the following Table 2.

A reflecting characteristic in this case was evaluated by checking a reflection rate in the case that a reflecting angle of the reflection light is changed from 0 to 60° when an incident light from a spot light source arranged on the reflecting surface (a corrugated surface) of the reflector member was kept constant of an incident angle of 30° from a direction crossing at a right angle with a longitudinal direction of the concave portion in respect to a vertical line for the surface of the reflector member.

A reflection rate in Table 2 is a value calculated by a liquid crystal panel evaluation device (a model LCD5000 made by Ohtsuka Denshi Co.,Ltd.) in which each of outputs of reflection light of sample Nos. 1 to 5 is divided by the aforesaid reference output and expressed by a percentage (%) in reference to an output of a reflection light at a reflection angle of 20° when a light is irradiated at an incident angle of 30° against a white board (a plate having a MgO standard white color surface).

In addition, the color merging state is set such that colors of reflection lights of sample Nos. 1 to 5 are expressed by a difference in respect to the aforesaid reference color tone in reference to a value in which a color tone of the color filter having no reflector member is expressed in an x-, y-chromaticity diagram, wherein a value having a difference in respect to the reference color tone of 0.4 or less for both x and y is expressed by ◯ and a value exceeding 0.4 is expressed by ×.

TABLE 2

| Sample No. | Applied reflector member, CF, Liquid crystal display panel structure | Reflection rate (%) | merging state | Contrast |
| --- | --- | --- | --- | --- |
| 1 | Example 1 (without BM), reflector member inside | 2.5 | ◯ | 5 |
| 2 | Example 2 (with BM), reflector member inside | 2.0 | ◯ | 4 |
| 3 | Comparison example 2 (without BM), reflector member inside | 32.0 | ◯ | 5 |
| 4 | Comparison example 3 (without BM), reflector member outside | 9 | x | 2 |
| 5 | Comparison example 4 (with BM), reflector member outside | 6 | x | 2 |

In reference to Table 2 and the result of measurement for the reflecting characteristic, the liquid crystal display panel of Sample No. 5 using member of Comparison Example 2 in which a concave portion of the corrugated surface of the reflector member is 0.2 μm and a color filter layer is formed on the corrugated surface had a large reflection rate and showed a narrow display with an angle of sight of ±4°. The liquid crystal display panels of Sample Nos. 4 and 5 with another layer interposed between the reflector member and the color filter layer show a low reflection rate of 6% to 9%, show a color merging caused by anisotropy and further show a contrast of about 2.

On the contrary, it is acknowledged that the liquid crystal display panel of Sample No. 1 using the panel of the example 1 has a sufficient reflection rate of 25% at a reflection angle of 20°, a sufficient high reflection rate in a range of up to a reflection angle of ±15° around a reflection angle of 30°, in particular, a range of ±10°, wherein a color merging caused by anisotropy is also improved and a contrast is also high at 5.

As described above, in the reflective type liquid crystal display of the present invention, the overcoat layer having a thickness of more than twice of a depth of the concave portion of the corrugated surface is formed on the corrugated surface of the stored reflector member, the color filter layer is formed on the overcoat layer, and corrugation at the corrugated surface of the reflector plate is made flat, resulting in that it is possible to prevent an irregular state from being generated in the thickness of the liquid crystal layer due to corrugation of the corrugated surface and further to improve a displaying quality. In addition, since the corrugated surface of the reflector member is covered by the overcoat layer of more than twice of a depth of the concave portion of the corrugated surface, it is possible to improve an electrical insulating characteristic between the reflector member and the transparent electrode (a displaying electrode) and when the display is driven, a sufficient voltage can be applied to the liquid crystal layer, resulting in that it can provide some advantages that no adverse effect is applied to the display and a stable driving can be carried out.

In addition, in the system in which the second overcoat layer is formed on the color filter layer, since the corrugation caused by the color filter layer is made flat by the second overcoat layer and so an effect that an irregular formation of the thickness in the liquid crystal layer is prevented can be improved.

Additionally, in the reflective type liquid crystal display of the present invention, since a color filter layer composed of color patterns of red, green and blue is formed on the corrugated surface of the stored reflector member, another layer is present between the reflector member and the color filter layer, color merging caused by anisotropy is not present and a high contrast can be attained.

What is claimed is:

1. A reflective type liquid crystal display comprising:
   a liquid crystal layer disposed between a display side glass substrate and a rear surface side glass substrate, said rear surface side glass substrate having an upper surface that faces said liquid crystal layer;
   a reflector member having a corrugated surface arranged on said upper surface of said rear surface side glass substrate, said corrugated surface having both convex and concave portions and said corrugated surface having a depth defined as the distance between an apex of said convex portion and a nadir of said concave portion;
   an overcoat layer having an upper surface closest to said liquid crystal layer, said overcoat layer formed on said corrugated surface of said reflector member such that said upper surface of said overcoat layer is flat; and
   a color filter layer formed on said overcoat layer;
      wherein a minimum thickness of said overcoat layer is more than twice said depth of said corrugated surface; and
      wherein said depth of said corrugated surface is between 0.5 and 5 $\mu$m and said thickness of said overcoat layer is between 1 and 10 $\mu$m.

2. A reflective type liquid crystal display according to claim 1, wherein a second overcoat layer is formed on said color filter.

3. A reflective type liquid crystal display according to claim 1, wherein
   said convex portions have a height and width, extend along a direction parallel with said rear surface side glass substrate; and
   said concave portions are arranged between said convex portions and said concave portions and said convex portions arranged next to each other; and
   said height and width of each of said convex portions are random.

4. A reflective type liquid crystal display according to claim 1, wherein said reflector member comprises a plurality of irregularly formed stripe grooves wherein;
   each of said plurality of irregularly formed stripe grooves have a width, extend along the same direction, and are cooperatively arranged;
   each of said plurality of irregularly formed stripe grooves has a curved surface shape having the same radius of curvature; and
   said widths of said stripe grooves are irregular in size, said widths of said irregularly formed stripe grooves arranged such that light reflected from said stripe grooves is prevented from producing interference stripes.

5. A reflective type liquid crystal display according to claim 1,
   wherein a thickness of said color filter layer is 0.15 to 1.2 $\mu$m, and each of pixels of three primary colors of red, green and blue are arranged in at least one of a set of patterns comprising: a stripe pattern in which the pixels are alternately arranged in either vertical or lateral orientation, a delta pattern in which the pixels are alternately arranged in a triangular shape, and a mosaic pattern in which the pixels are arranged in vertical orientation and lateral orientation.

* * * * *

UNITED STATES PATENT AND TRADEMARK OFFICE
CERTIFICATE OF CORRECTION

PATENT NO. : 6,130,736
DATED : October 10, 2000
INVENTOR(S) : Yorihiko Sasaki et al.

It is certified that error appears in the above-identified patent and that said Letters Patent is hereby corrected as shown below:

<u>Title page,</u>
Item [30], change "9-164778" to -- 9-164777 --.

Signed and Sealed this

Eighth Day of January, 2002

*Attest:*

JAMES E. ROGAN
*Attesting Officer*     *Director of the United States Patent and Trademark Office*